United States Patent [19]

Koppel

[11] Patent Number: 4,947,692

[45] Date of Patent: Aug. 14, 1990

[54] APPARATUS FOR DETECTING POSITIONAL CHANGES IN RELATION TO A VERTICAL REFERENCE DIRECTION IN BUILDINGS OR IN BUILDING SUBSOIL

[75] Inventor: Jakob Koppel, Wurenlos, Switzerland

[73] Assignee: Gesellschaft Zur-Forderung der Industrieorientierten Forschung An den Schweizerischen, Zurich, Switzerland

[21] Appl. No.: 329,959

[22] Filed: Mar. 29, 1989

[30] Foreign Application Priority Data

Mar. 30, 1988 [CH] Switzerland .................. 209/88

[51] Int. Cl.$^5$ .............................................. G01M 5/00
[52] U.S. Cl. ......................................... 73/786; 33/366
[58] Field of Search ................ 33/366, 378, 392, 309, 33/354, 393, 402; 250/231 R; 73/786; 340/689, 690

[56] References Cited

U.S. PATENT DOCUMENTS

| | | | |
|---|---|---|---|
| 3,880,528 | 4/1975 | Petersen et al. | 356/225 |
| 4,206,550 | 6/1980 | Boyett et al. | 33/286 |
| 4,627,172 | 12/1986 | Afromowitz | 33/366 |
| 4,812,654 | 3/1989 | Araujo | 33/366 X |

FOREIGN PATENT DOCUMENTS 2074315 10/1981 United Kingdom .

OTHER PUBLICATIONS

Patent Abstracts of Japan, vol. 10, No. 102 (P-448) (2159), Apr. 18, 1986.
Physical Instruments, Huggenberger AG, Zurich, Telecoordinator.

Primary Examiner—Jerry W. Myracle
Attorney, Agent, or Firm—Michael N. Meller

[57] ABSTRACT

A plumb weight hung onto a plumb wire anchored firmly at one end bears a laser light emitter which lies opposite a stationary photoelectric receiver. The receiver has a photodetector arrangement which is connected downstream of an optical system and a matt screen. The light emitter and receiver form an optical position measuring system. Relative movements between the anchoring point of the plumb wire and hence between the plumb body and the receiver transverse to the vertical direction result in a change of the position of the point of incidence of the light beam on the photodetector arrangement. By measuring the respective position of this light spot, the degree of movement of the plumb body and hence of the plumb wire anchoring point relative to the receiver can be determined.

10 Claims, 4 Drawing Sheets

APPARATUS FOR DETECTING POSITIONAL CHANGES IN RELATION TO A VERTICAL REFERENCE DIRECTION IN BUILDINGS OR IN BUILDING SUBSOIL

FIELD OF THE INVENTION

The present invention relates to an apparatus for detecting positional changes in relation to a vertical reference direction in buildings or in building subsoil.

BACKGROUND OF THE INVENTION

In known apparatuses of this type which serve for measuring the inclination and horizontal displacement of buildings such as dams and houses, a displacement in the building or of the building relative and transverse to the plumb wire is mechanically sensed by means of a measuring device having a probe attached to the plumb wire. The deflection of the probe is likewise mechanically transmitted to an angle converter which generates electrical signals corresponding to the deflection of the probe. These signals are further processed for displaying the displacement or for outputting an alarm.

These known plumb systems have, however, the disadvantage that only positional changes in one direction can be detected with one measuring device. If the positional changes are to be measured in two directions, that is, in one plane, then two measuring devices must be provided. The continuous mechanical contact between the probe and the plumb wire causes an interfering deflection of the latter, and moreover results in wear phenomena which can lead to incorrect measurements. In order to avoid these, frequent checks and a correspondingly expensive maintenance are necessary.

Inclinometers for determining the inclination of objects are known which have a non-contacting position measuring device. (See Patent Abstracts of Japan, Volume 10, No. 102 (P-448) (2159) 18 April 1986 and U.S. Pat. No. 4,627,172.) These known devices have a housing which is fastened to the object to be monitored. A light source (light-emitting diode) is arranged in the housing and a photoelectric receiver is arranged opposite to the light source. The light emitted by the light source is transmitted via a light guide to the receiver. The light guide forms part of a pendulum mounted at one end of the housing.

These known inclinometers differ in their construction from the present invention and are less suitable for detecting positional changes in large buildings such as dams.

SUMMARY OF THE INVENTION

The object of the present invention is to produce an apparatus of the aforementioned type which requires minimal maintenance outlay and which, with a simple construction, permits the most exact and most undisturbed measurement of positional changes in the building or in the building subsoil at any time.

In accordance with the invention, positional changes of a receiver relative to a reference direction or to a plumb body result in a change of position of a laser beam incident on the receiver of an optical position measuring arrangement. The receiver then generates electrical signals characteristic of the respective position of the point of incidence of the laser beam which are also characteristic of the degree of positional change. These signals are then used for displaying or outputting an alarm, specifically both at the installation site of the apparatus and at a place remote therefrom. By appropriate design of the receiver, it is possible to determine with the same position measuring arrangement positional changes in two mutually perpendicular directions, that is, in one plane. The recording of the positional changes takes place without contact and hence without wear, which makes possible an exact measurement which is substantially uninfluenced by interference variables. The fact that the laser beam incident on the receiver is sharply collimated also contributes to such an exact measuring. Moreover, continuous maintenance is not required.

In a preferred embodiment, the laser light emitter is arranged on the plumb body, while the receiver is placed so as to be stationary. In such an embodiment, the power supply of the light source can be effected particularly simply without wires or without contact.

BRIEF DESCRIPTION OF THE DRAWINGS

The preferred embodiments of the invention will be described in detail with reference to the drawings, wherein.

DETAILED DESCRIPTION OF THE PREFERRED EMBODIMENTS

Figure 1:
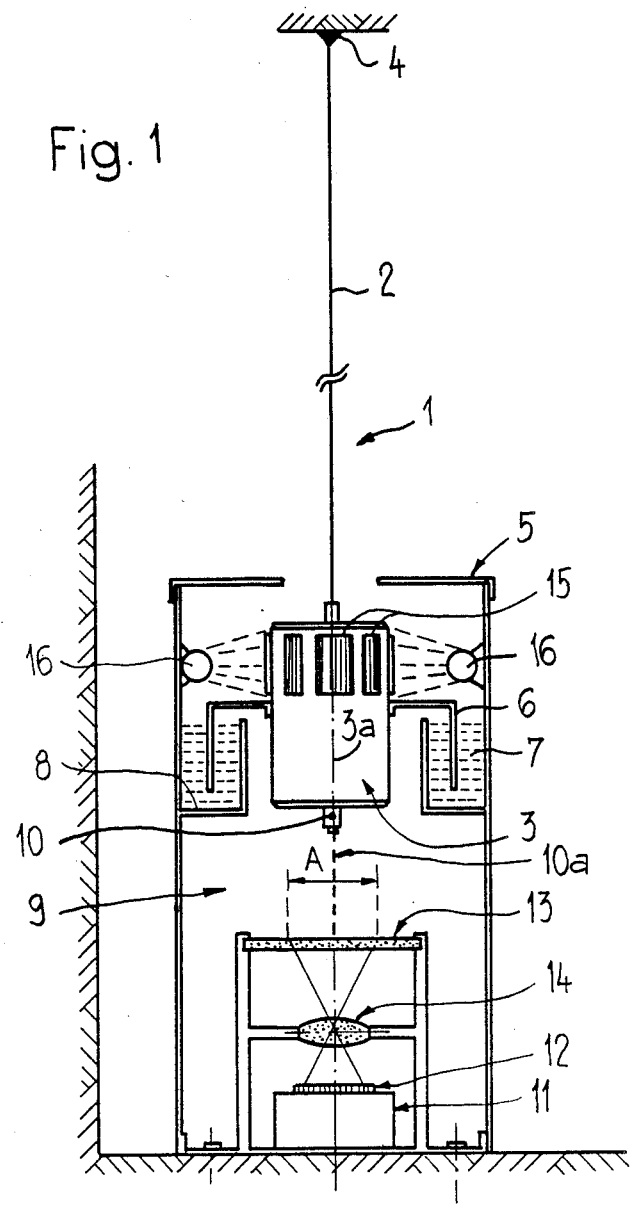
FIG. 1 diagrammatically shows an apparatus designed as a weight-type plumb system for measuring relative displacements transverse to the vertical direction.

The weight-type plumb system illustrated in FIG. 1 has a plumb wire 2 and a plumb body 3 fastened to its bottom end and designed as a plumb weight. At its top end, the plumb wire 2 is secured to a stationary anchoring point 4. The plumb body 3 is accommodated in a housing 5. The periphery of plumb body 3 bears on a damping element 6 which extends into a damping fluid 7 held by a reservoir 8 provided on the inside of the housing 5.

An optical position measuring arrangement 9 is provided for measuring relative displacements of the plumb body 3 transverse to the vertical direction. Arrangement 9 has a light emitter 10 and a receiver 11. The light emitter 10 is a laser attached to the bottom of plumb body 3. The light emitter 10 is aligned with the longitudinal axis 3a of the plumb body 3, which extends in the vertical direction when plumb body 3 is at rest. The receiver 11 is fixed relative to the housing 5 and has a photodetector arrangement 12 formed by one or more light-sensitive elements such as photodiodes or photo elements. A matt screen 13 (or a diffuser of different design) and an optical system 14 are arranged in the beam path between light emitter 10 and receiver 11. The laser beam 10a emitted by laser 10 appears on matt screen 13 as a light spot which forms an image on photodetector arrangement 12 via optical system 14. The optical system 14 serves to form a reduced image of the measurement area A on the matt screen 13 scanned by the laser beam 10a on the photodetector arrangement 12, which makes it possible to keep the photodetector arrangement 12 small, but nevertheless permits recording of considerable relative displacements.

The power supply of light source 10 is effected in accordance with the preferred embodiment of FIG. 1 without wires and without contact. The power supply arrangement comprises photo elements 15 (solar cells) arranged on the periphery of the plumb body 3. The photo elements 15 are opposed by stationary light sources 16 which are attached to the inside of the housing 5. The photo elements 15 convert the light received into an electrical current in a known manner. This power supply arrangement has the advantage that it in no way influences the behavior of the plumb body 3 in the case of relative displacements.

Figure 2:
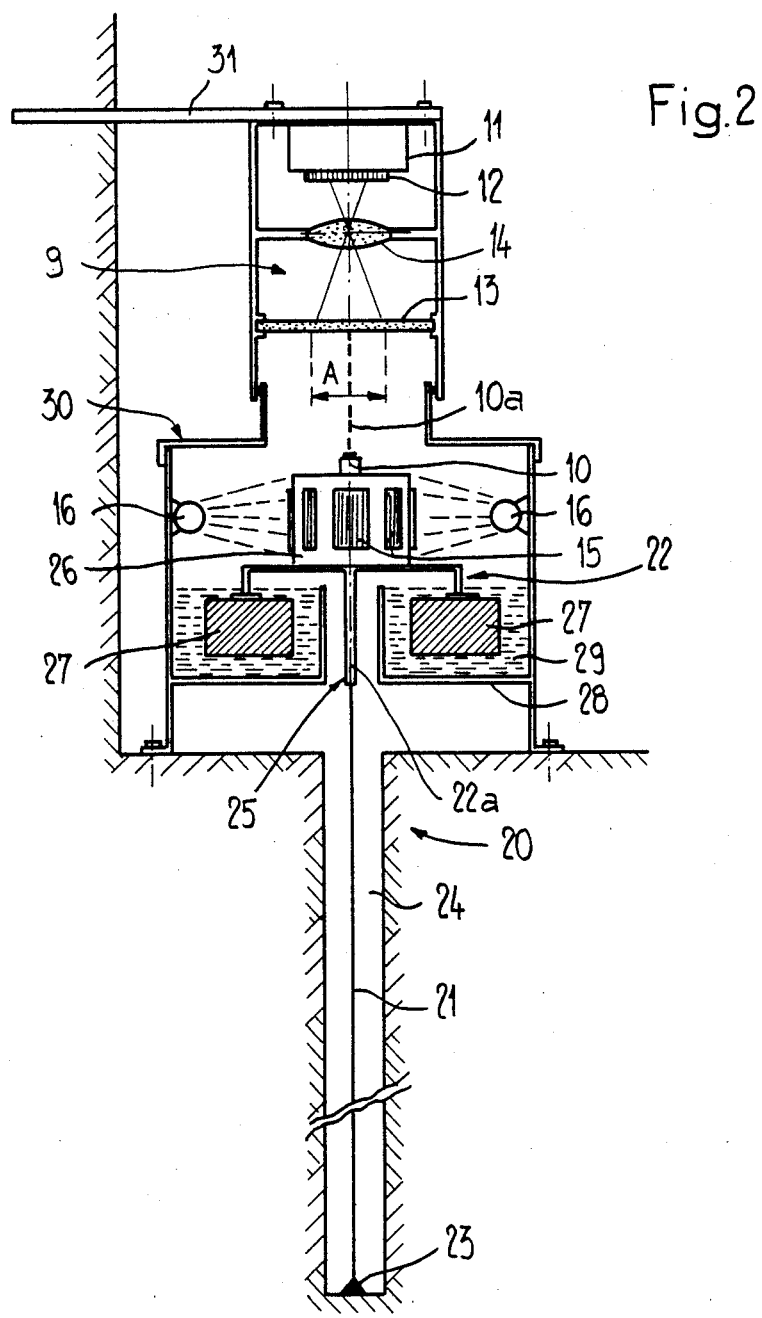
FIG. 2 diagrammatically shows an apparatus designed as a float-type plumb system for measuring relative displacements transverse to the vertical direction.

FIG. 2 shows a float-type plumb system 20 which differs from the weight-type plumb system according to FIG. 1 primarily by the different design and the different arrangement of the plumb body. The float-type plumb system 20 likewise has a plumb wire 21 and a plumb body designed as a float 22 which is fastened to the top end of the plumb wire 21. At its bottom end, the plumb wire 21 is secured to a stationary anchoring point 23, which is arranged in a borehole 24. The plumb body 22, the longitudinal axis 22a of which extends in the vertical direction, has a supporting structure 25, on which a supporting body 26 is supported. Fastened to the supporting structure 25 are floats 27 which are immersed in a fluid 29 held in a float tank 28. The plumb body 22 is enclosed by a housing 30.

Relative displacements transverse to the vertical are detected, exactly as with the plumb system according to FIG. 1, by an optical position measuring arrangement 9, which has the same construction as the position measuring arrangement shown in FIG. 1. Corresponding components of the two position measuring arrangements 9 in FIGS. 1 and 2 are therefore denoted by the same reference symbols.

With the embodiment according to FIG. 2, the power supply of the laser 10 is also effected by means of photo elements 15 (solar cells) which are arranged on the periphery of supporting body 26 and which are irradiated by light sources 16 arranged on the inside of housing 30.

Receiver 11, the matt screen 13 and the optical system 14 of the position measuring arrangement 9 are secured to a bracket 31.

Figure 3:
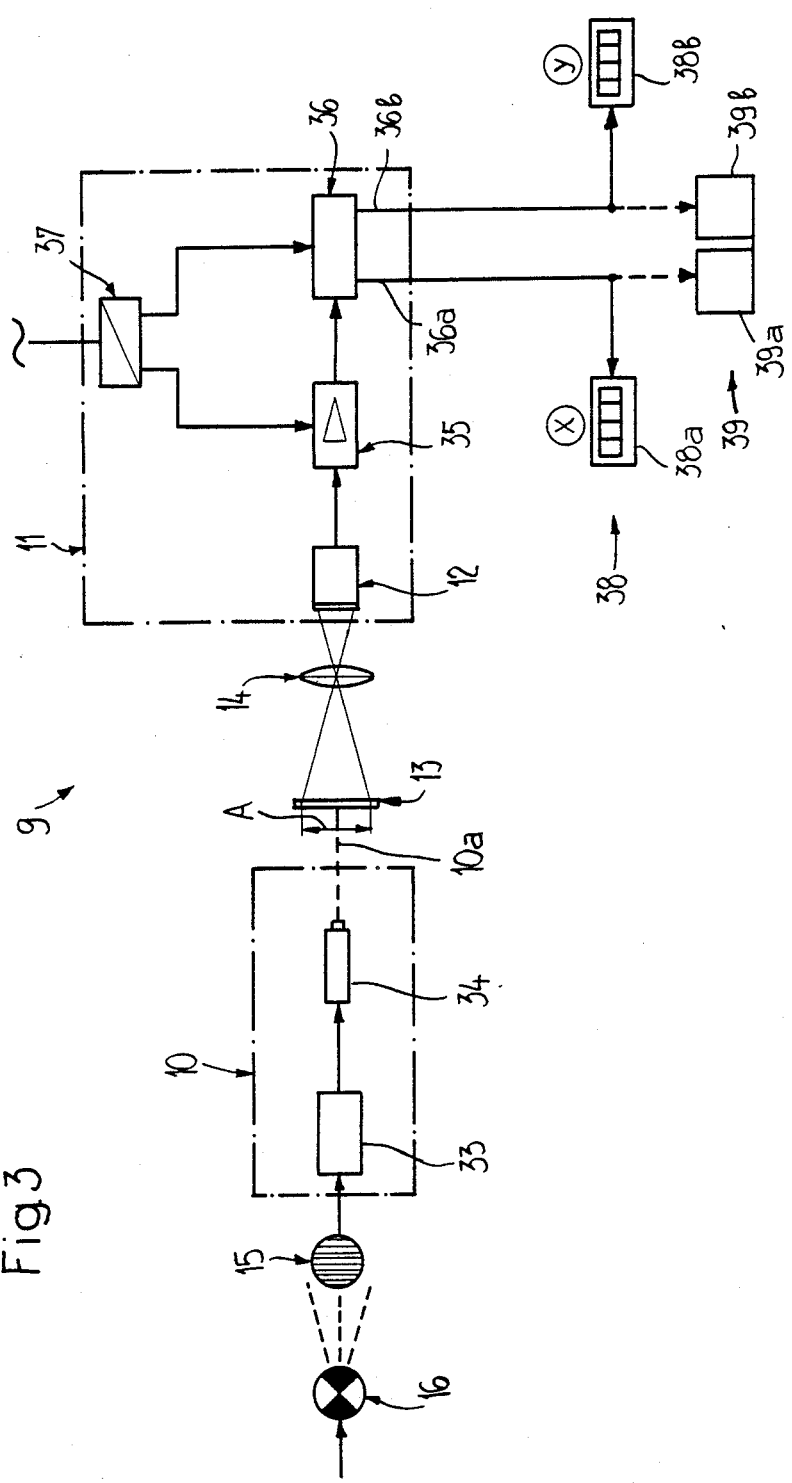
FIG. 3 is an electrical circuit block diagram of the optical position measuring arrangement used in the plumb systems according to FIGS. 1 and 2.

FIG. 3 is a block diagram of the optical position measuring arrangement 9 used in the plumb systems according to FIGS. 1 and 2. In FIG. 3, mutually corresponding components have the same reference symbols as used in FIGS. 1 and 2.

As is evident from FIG. 3, the laser 10 comprises a laser driver 33, which is supplied with power from the photo elements 15. The laser driver 33 is connected to the actual laser beam generator 34, which emits the laser beam 10a. Light beam 10a appears on the matt screen 13 as a light spot which forms an image on the photodetector arrangement 12 of the receiver 11 via the optical system 14. The receiver 11 further has a preamplifier 35 and an output amplifier 36, which are both supplied with electrical energy from a supply part 37. This supply part 37 is connected to a current source, for example, to the power supply system. The electrical signals generated in the photodetector arrangement 12 as a result of the incident light beam are transmitted via the preamplifier 35 to the output amplifier 36, which generates at its outputs 36a and 36b signals which are sent to a local display facility 38. Display facility 38 has a display 38a for displaying position in the X direction and display 38b for displaying the position in the Y direction. These electrical signals can also be transmitted to a remote point, such as is indicated in FIG. 3. The remote display arrangement 39 can likewise have a display 39a for displaying the position in the X direction and a display 39b for displaying the position in the Y direction. It is of course also possible to provide, in addition to or instead of the optical display arrangements 38 and 39, a registering display and/or an alarm system.

The mode of operation of the plumb systems 1 and 20 will now be described below with reference to FIGS. 1 to 3, this mode of operation being substantially the same for both embodiments according to FIGS. 1 and 2.

The longitudinal axis 3a, 22a of the plumb body 3, 22 and also the plumb wire 2, 21 extend in the vertical direction (reference direction). If there is a relative displacement between the anchoring point 4, 23 of the plumb wire 2, 21 and the receiver 11 in a direction transverse to the vertical, then the position of the plumb body 3, 22 changes relative to the receiver 11. This positional change results in a shift of the light spot incident on the photodetector arrangement 12 of the receiver 11 from its zero position. The corresponding positional change of the light spot is then converted in a manner known per se in the receiver 11 into electrical signals which are characteristic of the respective position of the light spot on the photodetector arrangement 12 in the X and Y directions, and hence also of the degree of relative displacement between plumb body 3, 22 and receiver 11. The corresponding actual-value signals appear at the output 36a or 36b of the output amplifier 36 and are used for position display or alarm output.

The movement of the plumb body 3, 22 relative to the receiver 11 is thus measured by detecting the corresponding movement of the light spot on the photodetector arrangement 12. The degree of this relative movement is thus measured without contact, so that the measurement operation cannot influence the relative movement in a falsifying manner. The relative displacement in different directions can be determined with a single position measuring arrangement 9. If, however, measuring relative movement in only one direction is required, then this can be achieved without difficulty by using another receiver.

Figure 5:
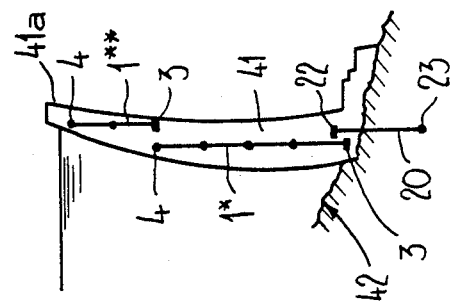
FIGS. 4 and 5 respectively show a front view and a side view of a dam wall monitored by means of plumb systems according to FIGS. 1 to 3.
Figure 4:
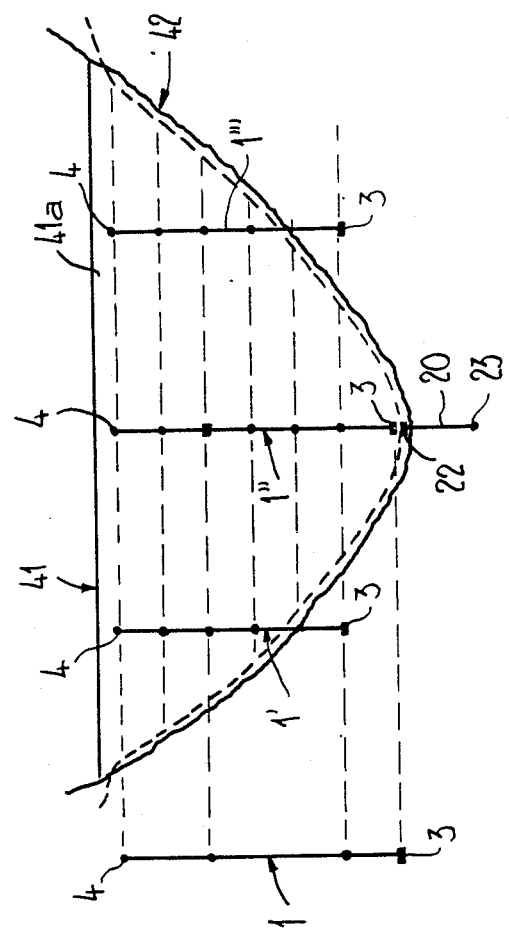

The plumb systems 1, 20 described are particularly suitable for monitoring dams. FIGS. 4 and 5 diagrammatically illustrate a dam wall 41 with built-in plumb systems 1, 20. Various installation possibilities of such plumb systems are now evident from FIGS. 4 and 5. For example, the weight-type plumb system 1 is completely accommodated in the building subsoil 42, while the weight-type plumb systems 1* and 1** as well as 1″ are completely accommodated inside the dam wall 41. In contrast, the anchoring points 4 of the weight-type plumb systems 1′ and 1′″ are located in the crest 41a of the dam wall, while the plumb bodies 3 of these plumb systems 1′ and 1′″ extend down into the building subsoil 42. In the case of the float-type plumb systems 20, the anchoring point 23 is located in the building subsoil 42, while the float 22 is arranged at the foot of the dam wall 41.

Apart from monitoring dams, the plumb systems 1, 20 described can also be used for measuring displacements with respect to the vertical in other buildings, for example, houses, and can also be placed in the building subsoil.

It is, of course, possible for the preferred embodiments to be modified as discussed briefly below.

For example, it is possible to reverse the positions of the light emitter 10 and the receiver 11 by fastening receiver 11 to the plumb body 3, 22 and arranging the light emitter 10 so as to be stationary. It is furthermore conceivable to make both light emitter 10 and the receiver 11 stationary, and to fasten an optical reflection system on the plumb body 3, 22 which reflects the light beam emitted by light emitter 10 onto receiver 11. In this case, however, it must be ensured that this optical reflection system is designed or arranged in such a manner that a rotation of the plumb body 3, 22 about its longitudinal axis 3a, 22a has no influence on the accuracy of the position measurement. This difficulty can easily be overcome in the case of the embodiments shown with light emitter 10 fastened to the plumb body 3, 22 by fastening light emitter 10 to plumb body 3, 22 so as to be aligned with the longitudinal axis 3a, 22a thereof.

The supply of the light emitter 10, fastened to the plumb body 3, 22, or receiver 11 can be effected, for example, also via a high-frequency energy transmission system which has a receiver part arranged on the plumb body 3, 22 and a stationary transmitter part which generates high-frequency electromagnetic oscillations which are converted by the receiver part into electrical energy. Such an energy transmission system does not require any cable connection to the plumb body 3, 22 either. In addition, it is also possible to supply the electrical energy via a cable to the light emitter 10 or the receiver 11. This cable would need to run in the plumb wire 2, 21 or form a part thereof. In such an embodiment, however, it should be ensured that the supply line does not disadvantageously influence the behavior of the plumb body 3, 22 during a relative movement.

What is claimed is:

1. Apparatus for detecting positional changes in relation to a vertical reference direction in buildings or in building subsoil, comprising:
   a plumb wire defining said reference direction, said plumb wire being anchored at one end;
   a plumb body connected to the other end of said plumb wire, and
   means for determining positional changes in the building or in the building subsoil relative to said plumb body by generating electrical signals characteristic of said positional changes,
   wherein said determining means in turn comprises means for emitting laser light and photoelectric means for receiving light emitted by said emitting means, said photoelectric means generating actual-value signals on the basis of the respective position of the incident light beam, which corresponds to the positional change of the building or building subsoil relative to the reference direction, and said emitting means being supplied with power by at least one photo element which is mounted on said plumb body and is irradiated by at least one stationary light source.

2. The apparatus as claimed in claim 1, wherein said photoelectric means comprises a photodetector arrangement which includes at least one photo element or at least one photodiode.

3. The apparatus as claimed in claim 1, wherein said photoelectric means is arranges so as to be stationary.

4. The apparatus as claimed in claim 3, wherein said emitting means is arranged on said plumb body in alignment with the longitudinal axis thereof.

5. The apparatus as claimed in claim 1, wherein an optical system forming a reduced image of the area scanned by the light beam is arranged upstream of said photoelectric means.

6. The apparatus as claimed in claim 5, wherein a diffuser is arranged upstream of said optical system.

7. The apparatus as claimed in claim 6, wherein said diffuser is a matt screen.

8. The apparatus as claimed in claim 1, wherein said plumb body is a plumb weight hanging on said plumb wire.

9. The apparatus of claim 1, wherein said plumb body is a float connected to said plumb wire at the top end thereof.

10. Use of the apparatus as claimed in claim 1 for monitoring a dam.

* * * * *